United States Patent [19]

Marchand

[11] 4,345,527
[45] Aug. 24, 1982

[54] SOLID FUEL PARTICLE AND AIR FUEL CONTROL DEVICE

[76] Inventor: William C. Marchand, 11339 Roxbury, Detroit, Mich. 48224

[21] Appl. No.: 168,072

[22] Filed: Jul. 14, 1980

[51] Int. Cl.³ .............................................. F23K 3/02
[52] U.S. Cl. ............................. 110/104 R; 110/186; 110/263; 110/347; 123/23; 406/66
[58] Field of Search .................. 110/104 R, 263, 347, 110/102, 186; 123/23; 60/39.46 S; 406/65, 66, 61, 144

[56] References Cited

U.S. PATENT DOCUMENTS

| | | | |
|---|---|---|---|
| 1,897,478 | 2/1933 | Holzwarth | 110/104 R X |
| 1,959,864 | 5/1934 | Hartley | 110/104 R X |
| 2,224,452 | 12/1940 | Witte et al. | 110/104 R |
| 2,923,261 | 2/1960 | Stoll | 110/104 R |
| 3,981,277 | 9/1976 | Abom | 123/23 |

Primary Examiner—Edward G. Favors
Attorney, Agent, or Firm—Remy J. VanOphem

[57] ABSTRACT

A solid fuel particle and air control device for use with combustion systems for a gas turbine engine and the like is disclosed. The device has a first housing with an inlet passage for receiving solid fuel particles. The first housing is mounted on a second housing with a blind cavity. A first passage extends through the second housing so as to intersect the blind cavity to permit flow communication therebetween. Solid fuel particles from the inlet passage of the first housing are metered and transfered to the blind cavity. A fluid pressure source is injected into the first passage in the secondary housing so as to entrain the solid fuel particles in the air as to form a uniform air entrained mixture. The air entrained mixture is then ejected out of the first passage in the second housing to a duct which communicates with the combustion system of the gas turbine engine where the air entrained solid fuel particle mixture is burned.

21 Claims, 11 Drawing Figures

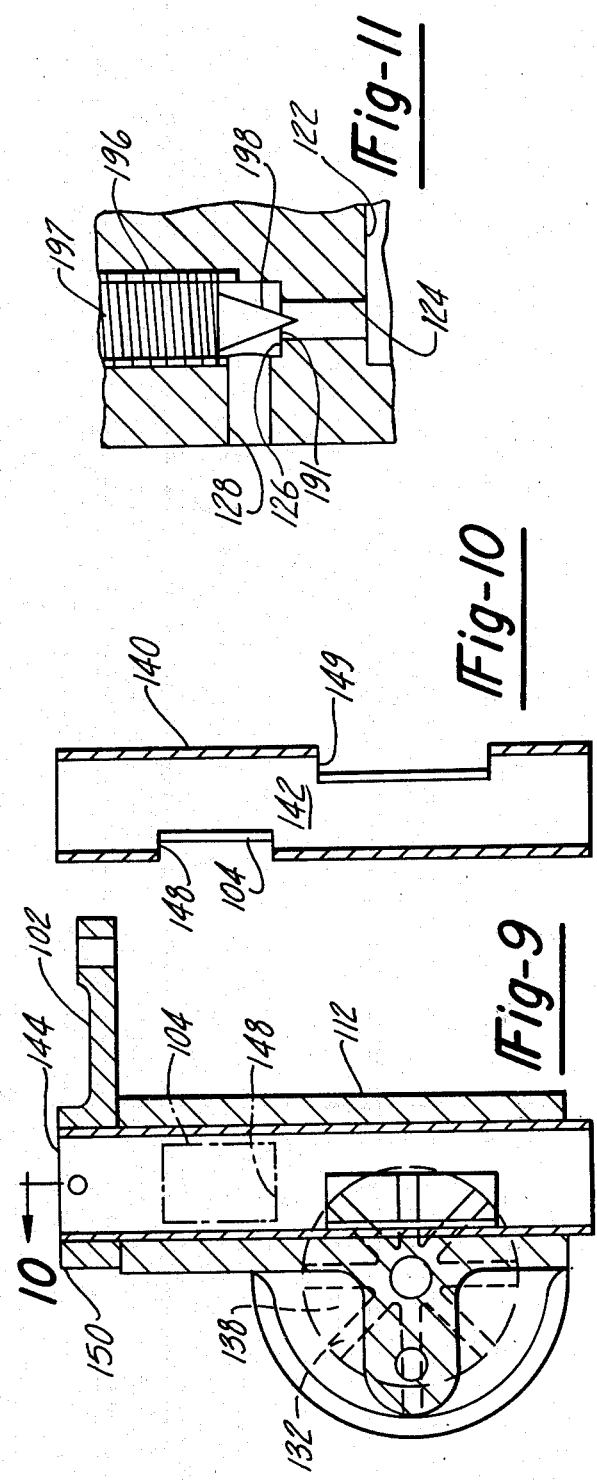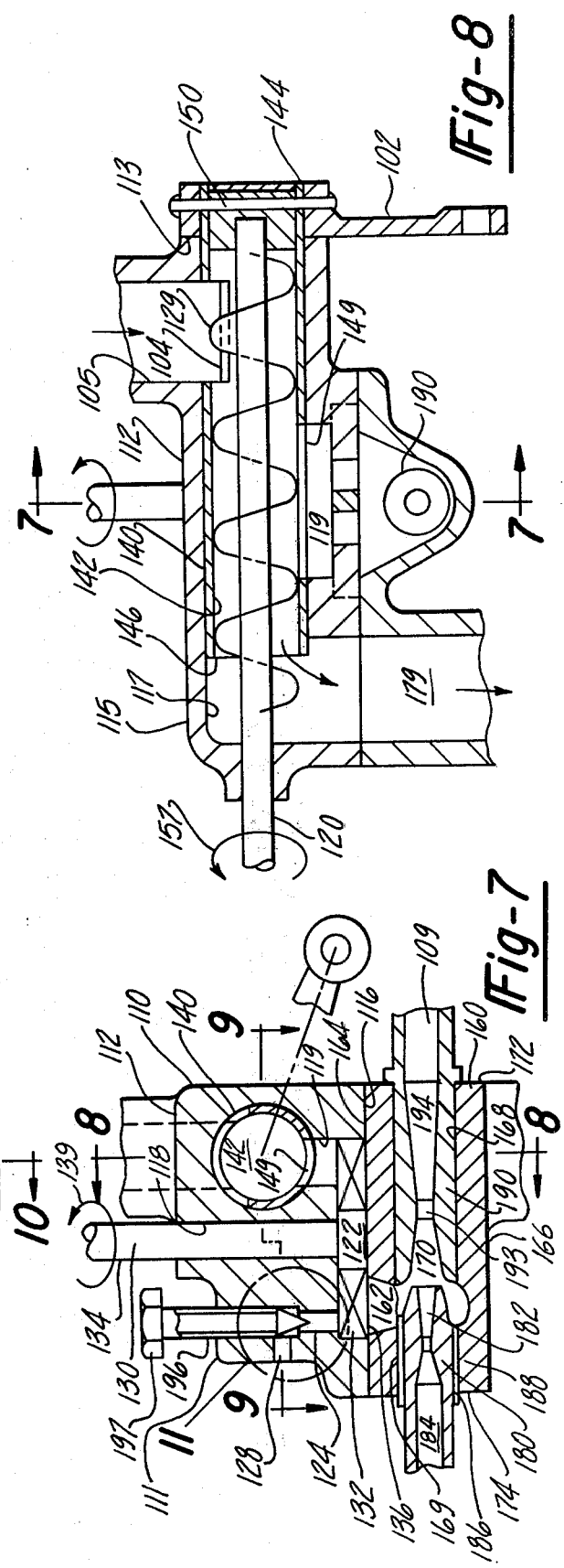

SOLID FUEL PARTICLE AND AIR FUEL CONTROL DEVICE

FIELD OF THE INVENTION

The present invention relates to a solid fuel particle and air control device and more particularly to a device which mixes pulverized fuel particles and air to form a combustible mixture for use in gas turbines.

BACKGROUND OF THE INVENTION

The United States consumes approximately 30% of the world's annual energy supply. About 93% of our energy requirements are provided by fossil fuels of which nearly half are from crude oil sources. Since crude oil production in the United States has been falling off since reaching a peak in 1972-1973, crude oil is supplied largely from the Middle East. Recent events in the Middle East have sharply focused our overdependence on foreign crude oil supplies and have made apparent our need to develop alternate energy sources. Thus, our attention has focused on finding renewable or noncritical forms of energy to replace our current foreign crude oil supplies.

Perennial growth matter such as wood, cotton trash, corn stalks, wheat chaff, forest residues, alfalfa, sunflower stalks, weeds, leaves, and other similar vegetation are in the category of renewable energy sources. Because of the ease with which sufficient renewable energy sources can be grown here in the United States, renewable energy sources have been receiving attention as a potential major source of energy.

Coal, once used as a major fuel source here in the United States long before the discovery of other fossil fuels, was displaced as a major fuel to a considerable degree for a number of years. However, because of its abundance here in the United States, coal is receiving renewed interest as a potential major source of energy because it is considered a noncritical energy form which can provide the energy required to sustain a reasonable standard of living while alternative sources of energy such as solar energy and nuclear energy can be perfected.

The wide spread utilization of coal as a major energy source or other renewable energy sources in the United States has been hampered by a lack of suitable means by which we directly convert these energy sources to useful work in such applications as automobiles, aircraft, locomotives, trucks, busses, electric generators, pumps, electric generating stations, etc. Although much research has been going on for years for transforming coal into other fuel forms, very little technical progress has been made to burn coal directly in internal combustion engines or increase the present use of coal burning furnaces because of the difficulty in burning coal rapidly and completely. The direct injection of solid pulverized fuels into an internal combustion engine or external combustion system dictates that the solid fuels be properly prepared prior to burning. Thus, it has been found that in order to burn solid fuels in internal combustion engines or external combustion systems, the solid fuels must be ground, shredded or pulverized to an appropriate particle size so that the solid fuels can be properly mixed with air so as to be burned quickly and completely in any combustion system.

There are several known prior art metering devices for solid fuels. For example, Steiger, U.S. Pat. No. 4,070,996, Rutz et al, U.S. Pat. No. 4,056,080 are directed to a reciprocating internal combustion engine which is fueled utilizing powdered fuel. Both of these devices utilize charged powdered coal which is injected or charged into the valve piston as the valve is opened to create an air blast for expelling the coal and air into the combustion chamber. In Lummis, U.S. Pat. No. 745,635, pulverized coal is utilized for the purpose of producing carbon monoxide.

Hardgrove, U.S. Pat. No. 2,275,394 and Havemann, U.S. Pat. No. 2,635,564 teach a combustion system for pulverized fuel. Specifically, Hardgrove teaches a pulverized fuel burning apparatus wherein bituminous coal is supplied as a function of steam load to a pulverizer. A fan providing carrier air moves the coal laden air through fuel supply lines to a fuel burning apparatus or furnace chamber of a steam generator. A secondary source of air is supplied through a wind box in a clockwise direction while a pair of fuel nozzles are arranged to supply a stream of fuel and air in a counter-clockwise direction. An adjustable blade impeller at the discharged end of the fuel nozzles enhances the mixing of the fuel stream with secondary air and the centrifugal effect of the primary fuel/air stream causes the larger coal particles to mix with the secondary air stream while the lighter particles remain in the primary air fuel stream. Havemann, U.S. Pat. No. 2,635,564 adapts a known vortex motion principle to impart a vortex motion to a primary air flow which is mixed with a secondary air flow containing fuel particles and preheated prior to being supplied to an injector system in a combustion chamber.

All of these prior art devices fail to produce a mixture of coal dust and air of proper proportions suitable for use in an appropriate combustion device so as to burn uniformly because the coal dust tends to cake and precipitate in the conduits and upon the seat of the charging valve. Furthermore, these prior art devices fail to evenly distribute the mixture before entering into the combustion chamber because the coal dust tends to agglomerate into balls of varying proportions. One prior art device which attempts to solve these problems in Holzwarth, U.S. Pat. No. 1,897,478. Holzwarth teaches an apparatus wherein a solid or solid fluid fuels are charged into constant volume combustion chambers associated with a turbine in such a manner that a completely uniform and homogeneous mixture of the fuels with the combustion supporting area is obtained. Holzwarth also teaches a safety mechanism to protect the charging devices against excessive and destructive pressures in the event of premature combustion or preignition of the fuel air mixture. Holzwarth's device, however, is very complex and expensive to make. In addition, Holzwarth must dilute the coal dust particles in a plurality of stages to uniformly suspend the particles in air.

Thus, none of the aforementioned designs provides a simple, inexpensive solid fuel particle and air metering device for mixing solid fuel particles with air in one stage to form a uniform air entrained mixture which does not agglomerate, cake or precipitate on the conduits prior to entering a suitable combustion device in gas turbines, diesels, Brayton cycles, stratified charge, Otto cycle, Sterling, free piston, Wankle, etc. or into an external combustion system such as a furnace.

SUMMARY OF THE INVENTION

The present invention provides a solid fuel particle metering and air mixing device for use with combustion systems in gas turbine engines which is simple and inexpensive to make. The device also mechanically or pneumatically transfers the solid fuel particles for mixing with air to form an air entrained mixture. Furthermore, the device prevents the precipitation and agglomeration of the solid fuel particles in the passages of the device. Finally, the device also meters the solid fuel particles and air to assure the proper air entrainment of the solid fuel particles and air over a wide range of operation required for use with gas turbine engines.

In accordance with the invention, a first housing with an inlet passage extending from an inlet portion through the opposite end portion is mounted on a second housing. The inlet passage receives solid fuel particles therein. A blind cavity is formed in the second housing so as to extend from an inlet end adjacent to the first housing toward the opposite end. A first passage extending from one side through the opposite side of the second housing intersects the blind cavity to permit flow communication therebetween. The solid fuel particles are metered and transferred from the inlet passage of the first housing to the blind cavity. A fluid pressure source such as air is injected into the first passage in the secondary housing so as to mix the air with the solid fuel particles to form a uniform air entrained mixture. Finally, the air entrained mixture is ejected out of the first passage in the second housing.

It is therefore a primary objective of the present invention to provide a device which meters solid fuel particles and mixes the fuel particles with air to form an air entrained mixture for use in a gas turbine combustion system which is simple and inexpensive to make.

It is a further object of the invention to provide a device which mechanically meters solid fuel particles and then mixes the fuel particles with air to assure the proper uniform air entrainment of fuel and air over a wide range of operation.

It is a still further object of the invention to provide a device which mechanically meters solid fuel particles and meters the air prior to mixing with the fuel particles so as to form an air entrained mixture which can be used over a wide range of operation in combustion engines or furnaces.

It is a still further object of the present invention to provide a device which mechanically meters solid fuel particles in response to the load on the engine so that the amount of solid fuel particles metered by the device varies over a range from zero to 100%.

It is a still further object of the present invention to provide a device which meters the solid fuel and mixes the fuel particles with air to form a uniform air entrained mixture which is simple and inexpensive to make and yet provides for the return of any excess fuel not required for the operation of the combustion system.

Other objects and advantages of the invention will become apparent upon reading the following detailed description and upon reference to the drawings.

BRIEF DESCRIPTION OF THE DRAWINGS

FIG. 7 is a sectional view of an alternate embodiment;

FIG. 8 is a sectional view along 8—8 of FIG. 7;

FIG. 9 is a sectional view along 9—9 of FIG. 7; and

FIG. 10 is a sectional view of a metering member of the alternate embodiment;

FIG. 11 is an enlarged sectional view in circle 11 of FIG. 7.

DETAILED DESCRIPTION OF THE PREFERRED EMBODIMENTS

Figure 4:
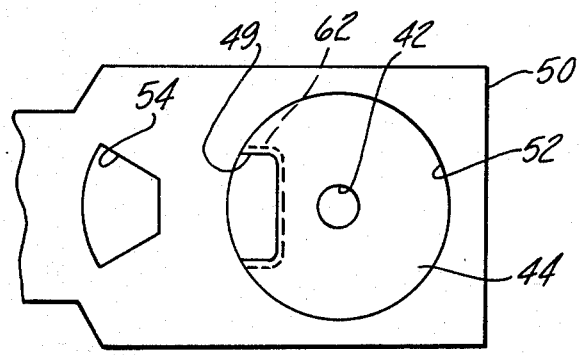
FIG. 4 is a perspective view of the intermediate member.
Figure 3:
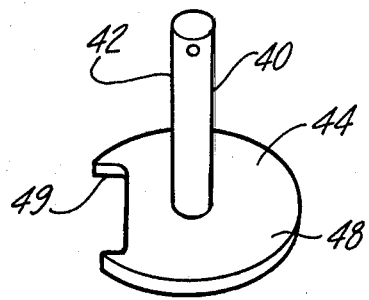
FIG. 3 is a perspective view of the metering member.

By way of a nonlimiting example, the device of my invention is used in a gas turbine engine such as described in my currently pending patent application Ser. No. 096,760 filed Nov. 23, 1979. The device of the invention is used to inject solid fuel particles and air into the fuel injector 500 at inlet port 542 of the combustion system shown in my currently pending patent application Ser. No. 096,760.

The preferred embodiment is shown in FIGS. 1 through 6. The device is generally designated by the numeral 100. The device 100 has a first housing 10 with an inlet passage 12 which is near the opposite end 16 of the first housing 10. A first duct 5 is connected through a hole 4 to the inlet passage 12 for flow communication therebetween. Solid fuel particles are transported pneumatically or mechanically from a source (not shown) through duct 5 to the inlet passage 12. A counterbore 22 is formed or machined in the opposite end 16 of the first housing 10. The counterbore 22 is located in the first housing 10 so as to offset from the inlet passage 12 but yet to permit flow communication between the inlet passage and the counterbore. Centrally located with the counterbore 22 is a first passage 18 extending from the counterbore 22 through the one end 14 of the first housing 10.

Figure 5:
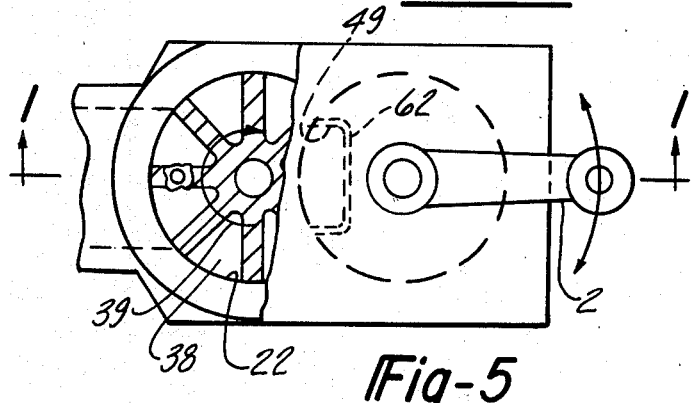
FIG. 5 is a top view of the preferred embodiment.
Figure 6:
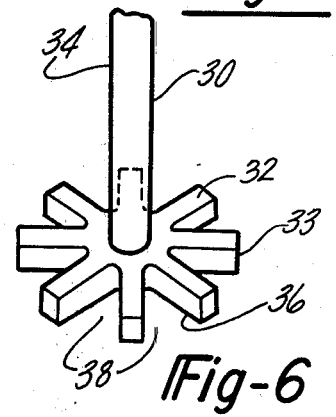
FIG. 6 is a perspective view of the impeller member.
Figure 1:
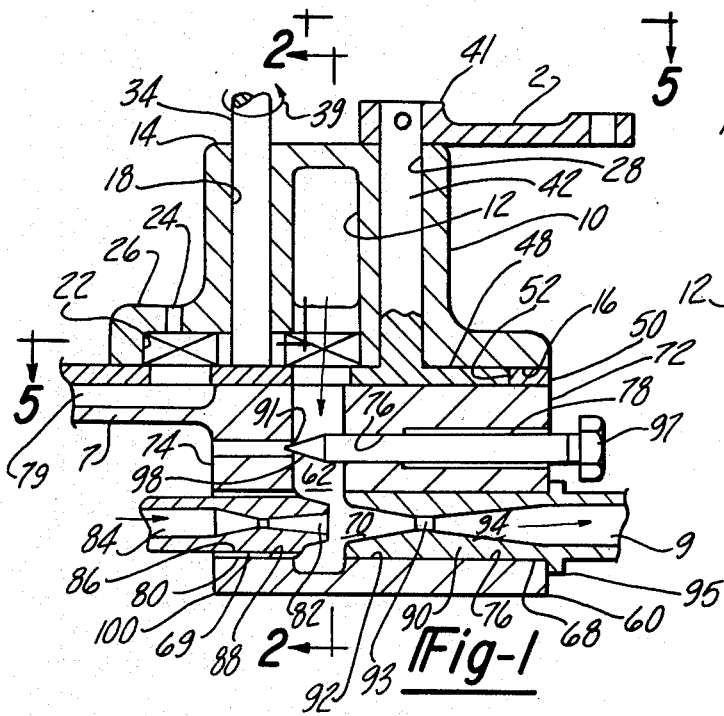
FIG. 1 is a sectional view of the preferred embodiment.
Figure 2:
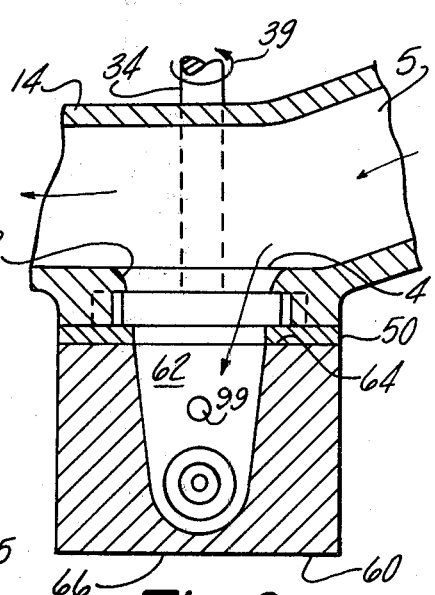
FIG. 2 is a partial sectional view taken along lines 2—2 of FIG. 1.

An impeller member 30 is formed with a plurality of vanes 32 which are attached to a shaft 34. The shaft 34 of the impeller member 30 is inserted into the first passage 18 and the vanes 32 are located in the counterbore 22. The vanes 32 extend radially from the shaft 34 to fit within the counterbore 22 with nominal clearance between the tip 33 of the vanes 32 and the counterbore 22. The nominal clearance permits the free rotation of the impeller member in the counterbore 22. The vanes 32 of the impeller member 30 are formed with a bottom surface 36 which, when the impeller member is fit into the first housing 10 and the vanes 32 fit into the counterbore 22, the bottom surface 36 does not project beyond the opposite end 16 of the first housing 10. The shaft 34 of the impeller member 30 extends beyond the one end 14 of the first housing 10 for a purpose to be described herein later. A plurality of spaces 38 are formed between the vanes 32 and the counterbore 22 to provide a means for moving and metering a quantity of solid fuel particles therein. The shaft 34 of the impeller member 30 is connected to a rotating means (not shown) and is rotated in a clockwise direction 39 as is shown in FIG. 5 so as to move solid fuel particles falling into the intervane spaces 38 from the inlet passage 12. Those skilled in the art will recognize that shaft 34 can also be rotated in the counterclockwise direction without departing from the invention herein described. A vent hole 24 is drilled into the second end portion 26 of the first housing 10 and extends through the first housing 10 to intersect the counterbore 22 for a purpose to be described herein later. A second passage 28 is formed or drilled through the first housing 10 from the one end 14 to the opposite end 16 so as to be spaced away from the counterbore 22, the first passage 18 and the inlet passage 12.

A metering member 40 with a shaft 42 and a round flat disc 44 is attached to one end of the shaft. The shaft 42 is inserted into the second passage 28 in the first housing 10 such that the face 48 of the disc is adjacent the opposite end 16 of the first housing 10. A notch 49 is formed in the disc 44. The second passage 28 in the first housing 10 is located in the first housing 10 such that the notch 49 in the disc 44 communicates with the counterbore 22 and is aligned with the inlet passage 12 in the first housing 10.

An intermediate plate member 50 is formed or drilled with a first circular opening 52 and a second arc segment opening 54. The intermediate member 50 is mounted adjacent to and extends across the opposite end 16 of the first housing 10. The first opening 52 is located in the intermediate member such that the disc 44 of the metering member 40 fits within the first circular opening 52 with nominal clearance therebetween to permit the free rotation or oscillation of the disc 44 within the first opening 52. The second arc segment opening 54 is located in the intermediate member 50 such that the second opening 54 is aligned with the counterbore 22 in a manner to be described herein later. The intermediate plate member 50 is attached to the first housing 10 by conventional means such as by threaded fasteners (not shown).

A second housing 60 is formed with a blind cavity 62 which extends from the inlet end 64 towards the opposite end 66. A first aperture 68 is formed or drilled into the second housing 60 so as to extend from one side 72 through the opposite side 74 so as to intersect the blind cavity 62. This permits flow communication between the blind cavity and the first aperture 68 and to form a mixing cavity 70 thereby. A second passage 76 is also formed or drilled into the second housing 60 so as to extend from the one side 72 through the opposite side 74 and also to intersect the blind cavity 62 to permit flow communication therebetween. The second passage 76, however, is located in the second housing 60 so as to be formed or machined between the inlet end 64 and the first aperture 68. A counterbore 78 is drilled into the second passage 76 and extends from the one side 72 toward the blind cavity 62 in the second housing 60. The second housing 60 at the inlet end 64 is mounted by conventional means, such as fasteners (not shown) to the intermediate plate member 50 such that the intermediate plate member is located between the first and second housings. The blind cavity 62 is further aligned with the counterbore 22 and the inlet passage 12 of the first housing 10. The second housing 60 further has a third passage 79 which is formed or machined in the inlet end and is centrally located with the vent hole 24 and communicates with the counterbore 22 in the first housing 10. The third passage 79 is connected to a second duct 7 for returning unused solid fuel particles back to the source (not shown).

A nozzle 80 with a diverging tip 82 is inserted into the opposite side 74 of the second housing 60 and into the first aperture 68 so that the tip 82 of the nozzle 80 projects into the mixing chamber 70. The other end 84 of the nozzle is connected to a fluid pressure source (not shown). The nozzle 80 is axially adjustable by any suitable manner into and out of the mixing chamber as for example, by means of a threaded connection 86 between the nozzle outer diameter 88 and the inner diameter 69 of the first aperture 68. The nozzle 80 converts the high pressure source of fluid into a high velocity stream of fluid and injects the high velocity stream of fluid into the mixing cavity 70. Those skilled in the art will recognize that the nozzle 80 operates by well known fluid flow principles.

Through the one side 72 of the second housing 60 and through the first aperture 68 is inserted an eductor 90. The eductor 90 has a mixing section 92, a diffuser portion 94 and a throat 93 between the mixing section and the diffuser portion. The eductor 90 is inserted into the first aperture 68 such that the exit end 95 of the diffuser portion 94 is mounted near the one side 72 of the second housing 60. A third duct 9 is connected to the first aperture 68 to connect the device 100 with the combustion system of a gas turbine engine (not shown).

A metering pin 97 with a conical tip 98 mounted in the counterbore 78 from the one side 72 of the second housing 60. The conical tip 98 is oriented within the second housing 60 so as to be able to project through the blind cavity 62 so as to abut against the opening 99 at the intersection of the second passage 76 with the blind cavity 62. The metering pin 97 is connected by suitable means to permit the axial adjustment in any suitable manner of the conical tip 98 relative to the opening 99 to control a gap therebetween and provide the desired pressure level in the mixing chamber 70.

Finally, the shaft 42 of the metering member 40 is connected at 41 to a lever arm 2. The lever arm 2 is then connected to a throttle linkage (not shown) which is operated by a fuel demand mechanism (not shown) as for example, a vehicle foot pedal, a hand lever or a governor.

In operation, the solid fuel particles are transported pneumatically or mechanically from a source (not shown) through the first duct 5 to the inlet passage 12 of the first housing 10. The solid fuel particles flow by gravity from the first duct 5 through a hole 4 into the inlet passage 12 and then into the rotating intervane spaces 38 of the impeller 30. The impeller 30 is rotated by suitable means (not shown) so as to be rotated at a constant speed or in the alternative with the speed varying in response increased fuel demand or engine speed. The solid fuel particles then drop by gravity from the intervane spaces 38 of the impeller member 30 through the notch 49 in the disc 44 and then into the blind cavity 62 of the second housing 60. The metering member 40 controls the amount of solid fuel particles that drop from the intervane spaces 38 into the blind cavity 62 by adjusting the relative opening of the notch 49 relative to the blind cavity 62. Thus, the metering member 40 can be rotated by the lever arm 2 so that in the closed position the notch 49 does not communicate with the blind cavity 62 and prevents the solid fuel particles from leaving the intervane spaces 38 in the impeller 30. In the open position of the metering member 40, the notch 49 is aligned with the blind cavity 62 for unrestricted flow communication from the intervane spaces 38 to the blind cavity 62. The metering member 40 may also be positioned in increments between the closed and open positions in response to the demand mechanism to restrict the flow of solid fuel particles from the intervane spaces 38 to the blind cavity 62. Any solid fuel particles which do not drop into the blind cavity 62 and thus remain in intervane spaces 38 are then rotated in the direction 39 by the impeller 30 so that the fuel particles fall by gravity through the second arc segment opening 54 into the third passage 79 in the second housing 60. In order to insure that the intervane spaces 38 are completely free of solid fuel particles when the impeller is rotated to the second arc segment opening 54, the third passage 79 is connected to a vacuum source (not shown). Thus, as an intervane space 38 of the impeller 30 becomes aligned with the second arc segment opening 54 in the intermediate plate member 50 and the vent hole 24, atmospheric air through the vent hole 24 is drawn into the intervane space 38 to clean and remove any solid fuel particles remaining in the intervane space. The fuel particles flow into the second passage and are drawn back to the source (not shown) by vacuum.

As previously discussed, the metered solid fuel particles fall from the intervane spaces 38 into the blind cavity 62 by gravity and continue to fall past the conical tip 98 of the metering pin 97 to the mixing cavity 70. As the solid fuel particles flow past the metering pin 97, the fuel particles may be mixed with atmospheric air which may be drawn into the blind cavity through the second passage 76 portion between the opposite side 72 of the housing 60 and the blind cavity 62 by action of the nozzle 80 to be described herein later.

The nozzle 80 is connected to a fluid pressure source at a pressure level which is higher than the pressure level in the third duct 9. The fluid pressure source is made to pass through the nozzle 80 so that the fluid pressure is converted into a high velocity stream of fluid which flows into the mixing cavity 70. The nozzle 80 is axially adjustable by any suitable means to permit the tip 82 of the nozzle to be moved relative to the mixing cavity 70 and the eductor 90 so as to obtain the desired fluid flow rate through the nozzle. The nozzle 80 acts as a jet pump to suck the atmospheric air through the gap 91 into the mixing cavity 70 so as to adjust the pressure level in the mixing cavity 70. The nozzle 80 is adjustable to permit the matching of the pressure level at the tip 82 of the nozzle 80 with the pressure level in the mixing cavity 70 to obtain the desired fluid and fuel particle flow. The air entrained solid fuel particles are thus mixed with the high velocity stream of fluid from the nozzle 80 and passed from the mixing cavity 70 into the mixing section 92 of the eductor 90 and then into the throat 93. Once past the throat 93, the mixture flows into the diffuser section 94 of the eductor where the high velocity mixture is slowed down and the pressure level of the mixture at the exit 95 of the diffuser section 94 rises. Because of the flow losses through the device 100, the pressure level at the exit 95 is lower than the pressure of the fluid pressure source. In the third duct 9, the solid fuel and air mixture is then made to flow to the combustor of the turbine engine or an internal combustion engine for combustion therein.

FIGS. 7 through 10 show an alternate embodiment of the invention. The alternate embodiment has a first housing 110. The first housing 110 has an inlet projection 112 which extends from one side 113 toward another side 115 of the first housing. The inlet projection 112 has a cylindrical bore 117 into which a cylindrical tube 140 with a bore 142 is rotatably mounted therein. A lever arm 102 is connected at a first end 144 to the tube 140 by any convenient suitable means such as a pin. The first end 144 of the tube 140 is closed by means of a cap member 150 which may be optionally integrally formed with the lever arm 102. The lever arm 102 abuts one side 113 of the first housing to prevent axial movement from one side to another side of the first housing 110. In the bore 142 of the tube 140 is mounted a screw conveyor 120 which has a shaft which extends through another side 115 of the first housing. The shaft is rotated in the direction 157 by a suitable source (not shown). The screw conveyor 120 when rotated in the direction 157 as shown in FIG. 8 has a screw thread 129 which advances from the first end 144 towards the second end 146 of the tube 140. A first duct wall 105 is connected to the inlet projection 112 and projects into the tube 140 at the open end 104 of the duct 105 for flow communication between the first duct 105 and the bore 142 of the tube 140. Since the inlet projection 112 is stationary and the tube 140 moves rotatably within the inlet projection 112, the tube 140 has a first slot 148 at 104 with a circumferential length to assure flow communication between the first duct 105 and the tube 140 with at least a 90° rotation of the tube relative to the duct. Solid fuel particles are transported pneumatically or mechanically from a source (not shown) through the first duct 105 to the tube 140. Solid fuel particles thus falling into the tube 140 are then advanced by the screw conveyor 120 from the first end 144 towards the second end 146 of the tube 140. Near the second end 146 of the tube 140 is a second slot 149. The second slot 149 has a smaller circumferential length than the first slot 148 and is formed near the inlet passage 119 which extends from the opposite end 116 of the first housing 110 to the inlet projection 112. A counterbore 122 is formed or machined in the opposite end 116 of the first housing 110. The counterbore 122 is located in the first housing 110 so as to be offset from the inlet passage 119 but yet permit flow communication between the second slot 149, the inlet passage 119 and the counterbore 122. Centrally located with the counterbore 122 is a first passage 118 which extends from the counterbore to the one end 111 of the first housing 110.

A second passage 124 is formed or machined in the first housing so as to be parallel but offset to the first passage 118. The second passage 124 extends from the counterbore 122 to the one end 111 of the first housing 110. An opening 128 is drilled or formed in the first housing 110 so as to be perpendicular to and intersect the second passage 124. The opening 128 is located between the one end 111 and the opposite end 116 of the first housing 110. The second passage 124 has a counterbore 126 from the one end 111 of the first housing to just below the intersection of the opening 128 with the second passage 124. A metering pin 197 is inserted into the second passage from the one end of the housing and is connected by thread means 196 to the second passage. The metering pin has a conical tip 198. Thread means 196 permits the relative adjustment by any suitable means of the conical tip 198 to the end of the counterbore to control the gap 191 therebetween.

An impeller member 130 similar to the one described in the preferred embodiment is inserted into the counterbore 122 and the first passage 118 so that the shaft 134 of the impeller extends beyond the one end of the first housing 110. The shaft 134 of the impeller member is rotated in the direction 139 by rotating means (not shown). The bottom surface 136 of the vanes 132 do not project beyond the opposite end of the first housing when the impeller is inserted into the counterbore 122 and the first passage 118. A plurality of intervane spaces 138 are formed between the vanes 132 and the counterbore 122 in the first housing 110.

A second housing 160 is formed with a blind cavity 162 which extends from the inlet end 164 toward the opposite end 166. A first aperture 168 is formed in the second housing 160 and extends from one side 172 through an opposite side 174 so as to intersect the blind cavity 162 to permit flow communication therebetween and to form a mixing cavity 170. The inlet end 164 of the second housing 160 is mounted by conventional means such as threaded connectors (not shown) to the first housing 110. The blind cavity 162 in the second housing 160 is further aligned with the counterbore 122 and the second passage 124 in the first housing 110. The second housing 160 also has a second aperture 179 which is positioned in the second housing so as to communicate with the second end 146 of tube 140 as will be described herein after.

A nozzle 180 with a diverging tip 182 is inserted into the opposite side 174 of the second housing into the first aperture 168 so that the tip 182 of nozzle 180 projects into the chamber 170. The other end 184 of the nozzle 180 is connected to a fluid pressure source (not shown). The nozzle is axially adjustable by any suitable manner into the mixing chamber 170 such as by means of a threaded connection 186 between the nozzle outer diameter 188 and the inner diameter 169 of the first aperture 168. The nozzle converts the high pressure source of air or fluid into a very high velocity stream of air into the mixing chamber 170 by well known fluid flow principles.

Through the one side 172 of the first aperture 168 is inserted an eductor 190. The eductor 190 has a mixing section 192, a throat 193 and a diffuser portion 194. The exit end of the diffuser section 194 is located near the one side 172 of the second housing 160. A third duct 109 is connected to the first aperture 168 at the exit end of the diffuser section and the one side 172 of the second housing 160 to connect the device with a combustor of a gas turbine engine (not shown) or an internal combustion engine.

In operation, solid fuel particles are delivered to the alternate embodiment either mechanically or pneumatically from a source (not shown) through a first duct 105. The solid fuel particles then flow by gravity from the first duct 105 through the first slot 148 and then into the bore 142 of the tube 140. The solid fuel particles are then moved by the screw thread 129 of the rotating screw conveyor 120 from the first end 144 toward the second end 146 of the tube 140. As the solid fuel particles are moved by the screw conveyor, the solid fuel particles pass near the second slot 149 in the tube 140. Thus, the solid fuel particles fall by gravity from the bore 142 through the second slot 149 and into the intervane space 138 of the impeller member in the counterbore 122 of the first housing 110. The tube 140 is rotatably mounted in the passage 112 to permit changing the relative position of the second slot 149 to the inlet passage 119. Thus, when the tube is rotated to the open position, that is, when the second slot 149 is aligned with the inlet passage 119, the fuel particles flow unimpeded into the inlet passage 119 of the first housing. The tube can also be rotated from the open position to a closed position, that is, when no part of the second slot is aligned with the inlet passage 119 and the fuel particles are prevented from dropping into the inlet passage 119. Those skilled in the art will recognize that the tube may also be rotated to an intermediate position between the open and closed position so as to restrict the flow of solid fuel particles into the inlet passage 119. Any solid fuel particles that do not fall into the second slot are then moved by the screw conveyor to the second end 146 of the tube 140 to then drop by gravity into the second aperture 179 of the second housing 160 where the solid fuel particles are returned to the source (not shown) by a suitable means such as an aspirator or conveyor (not shown).

The solid fuel particles that fall into the intervane spaces 138 of the impeller member 130 are then rotated by either a constant speed source or a source that varies the rotation of the impeller member 130 in response to fuel demand or engine speed. As the intervane spaces 138 become aligned with the blind cavity 162 in the second housing 160, the solid fuel particles fall by gravity into the blind bore and into the mixing chamber 170. As the fuel particles flow into the mixing chamber, they are mixed with air drawn into the opening 128, the second passage 124 and into the blind cavity 162 by the action of the nozzle 180 to be described later herein.

As described previously, the other end 184 of the nozzle is connected to a fluid pressure source at a pressure level which is higher than the pressure level in the third duct 109. As the fluid passes through the nozzle, the pressure is converted into a high velocity stream which then flows into the mixing chamber. The nozzle is axially adjustable in any suitable means to obtain the desired fluid flow rate through the nozzle and the eductor. For this purpose, the gap 191 between the second passage 124 and the conical tip 198 of the metering pin 197 is adjustable in any suitable manner to control the flow of air through the opening 128, through the counterbore 126, the gap 191, the second aperture 124, the counterbore 122, the intervane spaces 138 and into the blind cavity 162. The nozzle 180 acts as a jet pump to suck air through the opening 128 into the mixing chamber 170. The nozzle 180 is axially adjustable by any suitable means to permit the matching of the pressure at the exit of the diverging tip 182 of the nozzle with the pressure level in the mixing chamber and adjust the flow therethrough. The air entrained solid fuel particles are then mixed with the air in the mixing chamber as the mixture flows through the mixing portion of the eductor and then into the throat 193. Once past the throat 193, the mixture flows into the diffuser section of the eductor where the high velocity mixture is slowed down and the pressure level of the mixture at the exit end 195 of the diffuser 194 rises. From the exit end 194, the mixture flows into the third duct 109 and thence to the combustion system of a gas turbine engine (not shown).

Those skilled in the art will recognize the applicability of the device herein to be described in other internal combustion engines such as diesel engines, automotive gasoline, sterling, stratified charge, Wankle or free piston, etc. or external combustion systems such as furnaces.

Those skilled in the art will recognize the need to seal the various assembled components to prevent leakage of solid fuel particles and air pressure from the device as disclosed. Thus, in the first embodiment, a sealing member may be optionally required to prevent leakage between the first housing and the intermediate plate member. A sealing member may also be required between the intermediate plate member and the second housing. In the alternate embodiment, the sealing member may be optionally required to prevent leakage between the first and second housings. Depending on the operating conditions of the device, sealing means may also be optionally required to seal the other components of the device to prevent leakage.

Those skilled in the art will also recognize that the embodiments described hereinbefore may be formed or machined from cast iron, steel, aluminum, magnesium or any other suitable material.

While the invention has been described in connection with a preferred and alternate embodiment, it will be understood it is not intended to limit the invention to those embodiments. On the contrary, it is intended to cover all alternatives, modifications, and equivalents as may be included within the spirit and scope of the invention as defined by the appended claims.

What I claim is:

1. A solid fuel particle metering device for mixing solid fuel particles with air from a high pressure air source to form a uniform combustible mixture for burning in a combustion system, said device comprising:
   a first housing having an inlet end, an opposite end and portions defining a fuel inlet passage, said fuel inlet passage extending from said inlet end through said opposite end, said fuel inlet passage further adapted to receive said solid fuel particles therein;
   a second housing mounted adjacent to said first housing, said second housing having an inlet end neighboring the opposite end of the first housing; an opposite end distal said opposite end of the first housing; one side extending from said inlet end to said opposite end; an opposite side opposite to said one side and a body portion defining a blind cavity extending from said inlet end toward said opposite end, said housing body portion further having a first aperture extending from said one side through said opposite side and intersecting said blind cavity for flow communication between said blind cavity and said first aperture;
   means for metering and transferring said solid fuel particles from said fuel inlet passage in said first housing to said blind cavity of said second housing, said metering and transferring means being mounted in said first housing;
   means for injecting air from said air source into said blind cavity, said injecting means being mounted in said first aperture so as to mix air with the solid fuel particles in said blind cavity of the second housing to form said uniform combustible mixture; and
   means for ejecting said uniform combustible mixture from said blind cavity, said ejecting means being mounted in said first aperture in said second housing so as to eject said uniform mixture from said solid fuel particle metering device; said first housing further comprising a first passage adjacent but spaced away from said fuel inlet passage; a counterbore in said opposite end of the first housing and coaxially located with said first passage; a second air inlet passage means interposed said fuel inlet passage and said means for injecting air such so that the air entering said blind cavity through said injecting means causes air to flow through said second air inlet passage means from the outside of the solid fuel particle metering device into said second air inlet passage means to said blind cavity.

2. A device, as claimed in claim 1, further comprising:
   means, interposed said first and said second housings, for sealing said first and second housing to prevent leakage therebetween.

3. A device as claimed in claim 1, wherein said metering and transferring means further comprises:
   a metering member having a shaft and a plurality of vanes radially mounted to one end of said shaft, said shaft rotatably mounted in said first passage of said first housing and said plurality of vanes mounted in said counterbore, said plurality of vanes further being equally spaced to form equal openings between said plurality of vanes; and
   means for restricting the flow of solid fluid particles into said blind bore in said second housing.

4. A device as claimed in claim 1, wherein said injecting means further comprises:
   a nozzle mounted in said first aperture, said nozzle communicating with said blind cavity.

5. A device as claimed in claim 4, further comprising means, disposed in said blind cavity and said first aperture, for drawing atmospheric air into said blind cavity so as to provide optimum flow through said nozzle.

6. A device as claimed in claim 3 wherein said restricting means further comprises:
   an intermediate member mounted between said first and second housing;
   a metering member mounted in a first opening in said intermediate member, said metering member having a shaft and a disc mounted to one end of said shaft, said shaft rotatably mounted in said first passage, and means, disposed in said disc, for regulating the flow of solid fuel particles from said inlet passage into said blind bore in said second housing.

7. A device as claimed in claim 3 wherein said restricting means further comprises:
   means, mounted in said first housing, for regulating the flow of solid fuel particles through said inlet passage.

8. A device as claimed in claim 7, wherein said regulating means further comprises:
   a tube rotatably mounted in said inlet passage, said tube having a longitudinal slot communicating with said counterbore in said first housing for controlling the flow of solid fuel particles into said counterbore.

9. A solid fuel entrainment apparatus for mixing solid fuel particles with air from a high pressure air source to form a uniform combustible mixture for burning in a combustion system, said apparatus comprising:
   a first housing having an inlet end portion, an opposite end portion and portions defining an inlet passage extending from said inlet end portion through said opposite end portion; a first passage located parallel to but spaced away from said inlet passage and extending from said inlet end portion through said opposite end portion; a second passage located parallel to but spaced away from said inlet passage and spaced away from said first passage and extending from said inlet end portion through said opposite end portion; a counterbore centrally located with said first passage, said counterbore extending from said opposite end portion toward said inlet end portion, said counterbore further being located adjacent to said inlet passage for flow communication therebetween, said inlet passage further receiving solid fuel particles therein;
   an intermediate plate member mounted contiguous to said opposite end portion of said first housing, said intermediate plate member having portions defining a first opening centrally located with said second passage and further located adjacent to said counterbore and in spaced relation with said inlet passage for flow communication therebetween, said intermediate plate member further having a second opening located adjacent to but spaced away from said first opening and contiguous to said counterbore for flow communication therebetween;

means, disposed in said inlet passage in said first housing for metering and transferring solid fuel particles from said inlet passage to said first passage in said intermediate member;

a second housing mounted contiguous to said intermediate plate member, said second housing having an inlet end, an opposite end, one side adjacent to said inlet end, another side opposite said one side and portions defining a blind cavity extending from said inlet end toward said opposite end, said blind cavity being aligned with said inlet passage of said first housing and adjacent to said first passage of said intermediate member for flow communication therebetween, a duct located adjacent to said second opening for flow communication therebetween, a first aperture extending from said one side to said another side and intersecting said blind cavity for flow communication therebetween and a second passage located between said first aperture and said inlet end, said second passage extending from said one side to said another side and intersecting said blind cavity for flow communication therebetween, said second passage receiving ambient air therethrough;

means, mounted in said second passage, for metering ambient air through said second passage into said blind cavity so as to entrain the solid fuel particles therein;

means, mounted in said first aperture adjacent to said opposite side in said second housing, for injecting said source of high pressure air into said first aperture;

means, located in said blind cavity and adjacent to said first metering means, for mixing the solid fuel particles and with air to form a mixture of solid fuel particles and air; and means, mounted in said first aperture adjacent to said one end, for accelerating said mixture of solid fuel particles and air out of said second housing.

10. An apparatus, as claimed in claim 9, further comprising:

first means, interposed said first housing and said intermediate member, for sealing between said first housing and said intermediate member to prevent leakage therebetween.

11. An apparatus, as claimed in claim 10, further comprising:

second means, interposed said intermediate member and said second housing, for sealing between said intermediate member and said second housing to prevent leakage therebetween.

12. An apparatus, as claimed in claim 9, wherein said metering means further comprises:

a metering member having a shaft and a plurality of vanes radially mounted to one end of said shaft, said shaft rotatably mounted in said first passage of said first housing and said plurality of vanes mounted in said counterbore, said plurality of vanes further being equally spaced about said shaft to form equal openings between said plurality of vanes; and means, for restricting the flow of solid fuel particles into said blind cavity in said second housing.

13. An apparatus as claimed in claim 12 or wherein said injecting means further comprises a nozzle connected to said high air source.

14. An apparatus as claimed in claim 13 wherein said restricting means further comprises:

a metering member mounted in said first opening in said intermediate member, said metering member having a shaft and a disc mounted to one end of said shaft, said shaft being rotatably mounted in said first passage, and means, disposed in said disc, for regulating the flow of solid fuel particles from said metering member into said blind cavity in said second housing.

15. An apparatus as claimed in claim 14, further comprising means, disposed in said blind cavity and said first aperture, for drawing atmospheric air into said blind bore so as to provide optimum flow through said nozzle.

16. An apparatus, as claimed in claim 12 or 15, further comprising means for removing all solid fuel particles in said openings between said plurality of vanes.

17. A solid fuel entrainment apparatus for mixing solid fuel particles with air from a high pressure source to form a uniform combustible mixture for burning in a combustion system, said apparatus comprising:

a first housing having one end, an opposite end, one side adjacent to said one end and portions defining an inlet passage extending from said one end through said opposite end, a first passage located parallel but spaced away from said inlet passage and extending from said one end through said opposite end, a counterbore centrally located with said first passage and extending from said opposite end toward said one end and a second passage located parallel but spaced away from said inlet passage and said first passage and extending from said one end through said oppsote end, said counterbore further being located adjacent to said inlet passage and said second passage for flow communication therebetween, said inlet passage further receiving solid fuel particles therein, said first housing further having an opening intersecting said second passage for flow communication between the second passage and ambient air;

a second housing mounted contiguous to said first housing, said second housing having an inlet end, an opposite end, one side adjacent to said inlet end, another side opposite said one end and portions defining a blind cavity extending from said inlet end toward said opposite end, said blind cavity being aligned with said second passage in said first housing and adjacent to said counterbore in said first housing for flow communication therebetween and a first aperture extending from said one side to said another side and intersecting said blind cavity for flow communication therebetween;

means, disposed in said first passage, for metering said solid fuel particles;

means, disposed in said first housing, for transferring solid fuel particles from said inlet passage to said blind cavity in said second housing;

means, mounted in said first aperture in said second housing, for injecting high pressure air into said first aperture so as to mix air with the solid fuel particles in said first aperture in said second housing to form a uniform combustible mixture;

means, mounted in said first aperture, in said second housing, for ejecting said uniform combustible mixture out of said first aperture in said second housing.

18. An apparatus as claimed in claim 17 further comprising:
means, interposed said first and said second housings, for sealing said first and second housing to prevent leakage therebetween.

19. An apparatus as claimed in claim 18 wherein said metering means further comprises:
a metering member having a shaft and a plurality of vanes radially mounted to one end of said shaft, said shaft being rotatably mounted in said first passage of said first housing and said plurality of vanes mounted in said counterbore, said plurality of vanes further being equally spaced about said shaft to form equal openings between said plurality of vanes; and
means for restricting the flow of solid fuel particles into said blind cavity in said second housing.

20. An apparatus as claimed in claim 19 wherein said restricting means further comprises:
means mounted in said first housing, for regulating the flow of solid fuel particles through said inlet passage.

21. An apparatus as claimed in claim 20, wherein said regulating means further comprises:
a tube rotatably mounted in said inlet passage, said tube having a longitudinal slot communicating with said inlet passage in said first housing for controlling the flow of solid fuel particles entering said counterbore.

* * * * *

UNITED STATES PATENT AND TRADEMARK OFFICE
CERTIFICATE OF CORRECTION

PATENT NO. : 4,345,527
DATED : August 24, 1982
INVENTOR(S) : William C. Marchand It is certified that error appears in the above-identified patent and that said Letters Patent is hereby corrected as shown below:

Column 4, line 35, after "to" insert ---- be ----.

Column 4, line 48, delete "the" first occurrence and insert ---- this ----.

Column 6, line 20, after "98" insert ---- is ----.

Column 6, line 29, after "gap" insert ---- 91 ----.

Signed and Sealed this

Ninth Day of August 1983

[SEAL]

Attest:

GERALD J. MOSSINGHOFF

Attesting Officer    Commissioner of Patents and Trademarks